United States Patent [19]
Kimura et al.

[11] Patent Number: 5,531,950
[45] Date of Patent: Jul. 2, 1996

[54] METHOD OF MANUFACTURING A CASING FOR AN ELECTRONIC APPARATUS

[75] Inventors: Kouichi Kimura; Kouta Nishii; Masanobu Ishizuka, all of Kawasaki, Japan

[73] Assignee: Fujitsu Limited, Kawasaki, Japan

[21] Appl. No.: 251,818

[22] Filed: May 31, 1994

[30] Foreign Application Priority Data

Sep. 7, 1993 [JP] Japan ................................ 5-222406
Jan. 20, 1994 [JP] Japan ................................ 6-004730

[51] Int. Cl.⁶ ................................ B29C 45/14
[52] U.S. Cl. ................ 264/135; 264/259; 264/265; 264/273
[58] Field of Search .................. 264/265, 259, 264/135, 273

[56] References Cited

U.S. PATENT DOCUMENTS

| | | | |
|---|---|---|---|
| 3,077,658 | 2/1963 | Wharton | 264/265 |
| 3,246,066 | 4/1966 | Gits | 264/135 |
| 4,555,294 | 11/1985 | Adams et al. | 264/259 |
| 4,832,990 | 5/1989 | Boccalon et al. | 264/135 |
| 4,860,425 | 8/1989 | Kunisaki et al. | 264/259 |

FOREIGN PATENT DOCUMENTS

| | | | |
|---|---|---|---|
| 53-27290 | 8/1978 | Japan | 264/265 |
| 53-46352 | 8/1978 | Japan | 264/273 |
| 55-69421 | 5/1980 | Japan | 264/265 |
| 57-39923 | 3/1982 | Japan | 264/265 |
| 57-83427 | 5/1982 | Japan | 264/259 |
| 57-201639 | 12/1982 | Japan | 264/265 |
| 59-124193 | 7/1984 | Japan . | |
| 61-24420 | 2/1986 | Japan | 264/259 |
| 1-198099 | 8/1989 | Japan . | |
| 2-256937 | 10/1990 | Japan . | |
| 5-104638 | 4/1993 | Japan . | |
| 2093754A | 9/1982 | United Kingdom | 264/265 |

*Primary Examiner*—Robert Davis
*Attorney, Agent, or Firm*—Staas & Halsey

[57] ABSTRACT

A method of manufacturing a casing for electronic apparatus use in which metal and resin are subjected to a hybrid formation, so that the mechanical strength of the casing is improved and the thickness is reduced so as to reduce the weight. An electronic apparatus casing having a rib (16) and boss (18) is manufactured when metal (10) and resin (12) are integrally formed. Adhesive (14) is coated on the metal, and after the coated adhesive has been dried, the resin (12) is injected onto the adhesive layer from a portion which composes the rib or boss, so that the metal and resin are subjected to a hybrid formation.

21 Claims, 12 Drawing Sheets

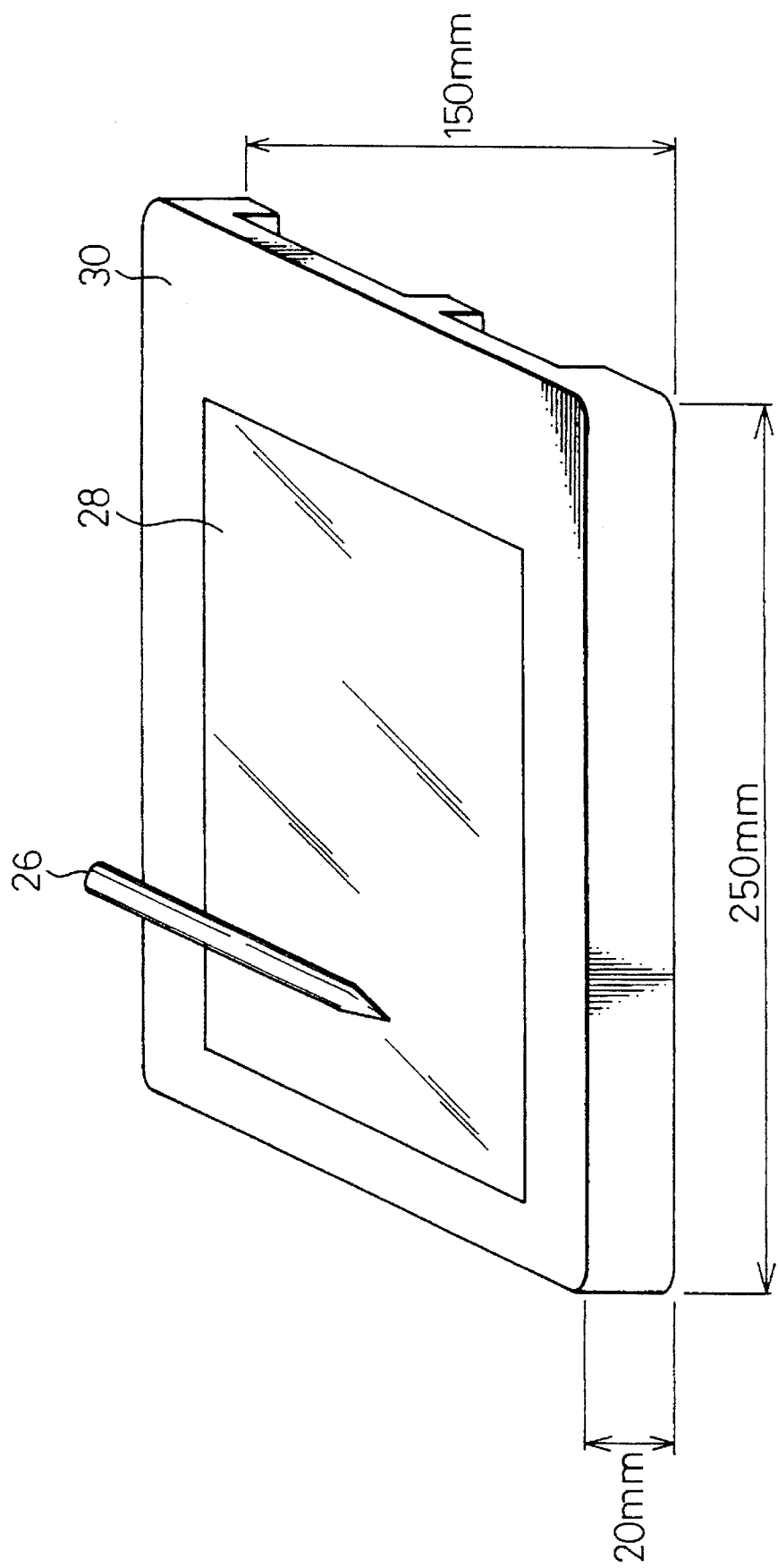

METHOD OF MANUFACTURING A CASING FOR AN ELECTRONIC APPARATUS

BACKGROUND OF THE INVENTION

1. Field of the Invention

The present invention relates to a method of manufacturing a housing or casing for an electronic apparatus such as a personal computer and the like, and more particularly relates to a method of manufacturing a casing for an electronic apparatus in which the formability, mechanical strength and heat radiating (or cooling) property are improved when metal and resin are integrated into one body by applying an adhesive agent of heat-resistant rubber or an adhesive agent of hot-melt and also by applying a film-like adhesive agent or a surface processing agent.

There is provided a method referred to as "in-mold forming" in which metallic parts and resin are integrated by means of injection molding. According to the in-mold forming method, metallic parts are set in a metallic mold, and then resin is injected into the metallic mold so as to integrate the parts with the resin. There are two types of in-mold forming methods, one is an insert forming method by which the metallic parts are embedded in the resin, and the other is an outset forming method by which resin parts are formed on a metallic base plate.

2. Related Art

Conventionally, for the casing for a portable electronic apparatus such as a notebook type computer, electronic notebook, portable telephone and the like, resin is used from the viewpoints of reducing the weight, improving the appearance, and maintaining the insulation. Usually, the weight of the casing is 30 to 50% of the entire electronic apparatus. Accordingly, when the weight of the casing is reduced, the weight of the entire electronic apparatus can be greatly reduced. In order to reduce the weight of the electronic apparatus, the wall thickness of the casing is reduced. However, the mechanical strength of the ABS (acrylonitrile-butadien-stytrene) resin, which is commonly used for the casing, is not sufficient, so that the wall thickness cannot be reduced. Therefore, the casings can be made of engineering plastics of high mechanical strength such as aromatic polyamide and PPS (polypropylene styrene) or can be made of polymer alloy of ABS-PC (polycarbonate) and can be made by adding a bulking agent such as carbon fiber.

However, compared with ABS resin, it is difficult to inject the above engineering plastics with sufficient pressure to form a thin wall. Further, it is difficult to coat or plate with metal the surface of the above engineering plastics. Furthermore, even when the above engineering plastics are used, sufficient mechanical strength and rigidity are not provided. Even when a polymer alloy is used or a bulking agent such as carbon fiber is added, the circumstances are the same. Especially, there is a probability that a portable electronic apparatus such as a computer or word processor be dropped while an operator is walking. Therefore, an anti-shock property is required for the casing so that not only the casing but also the inside electronic parts are not damaged even when the electronic apparatus drops from a height of approximately 1 m. In computer and other devices, the IC chips are highly integrated in accordance with the high processing speed of the apparatus. Therefore, the thermal output of the electronic elements is high. When these parts are substantially assembled into the casing at a high density, it is important to improve the heat radiating property. However, at present, a resin for forming a thin wall of high mechanical strength completely satisfying these properties is not provided, and a casing made of the resin is not provided, either.

On the other hand, in order to satisfy the required performance, there is provided a method of making a casing for metal such as an Al (aluminum) sheet, Al alloy, or of die-cast Hg (magnesium) alloy. However, in the case where the casing is made by means of aluminum sheet metal, it is difficult to form a boss, rib and engaging portion. In the case where the casing is made by means of aluminum alloy die-cast, it is difficult to form a thin wall not more than 1 mm. In addition to the above disadvantages, when the casing is made of these metals, the rigidity becomes high, so that a shock can not be absorbed when the apparatus drops onto a floor. In this case, there is a possibility that the intended electronic parts to protect are damaged although the casing is not damaged.

As described above, a single metal structure or a single resin construction does not offer the required mechanical strength, formability, anti-shock and heat-radiating characteristics.

However, when a resin and metal are combined the above problems can be solved. In order to integrate metal and resin into one body, there is provided a method referred to as an in-mold forming method. In-mold forming is applied to the casing in the following manner:

In one method, a casing is provided, in which a metallic net having electromagnetic shielding properties, the profile of which is the same as that of the casing, is subjected to insert forming, so that the electromagnetic shielding properties can be improved (Japanese Unexamined Patent Publication (Kokai) No. 59-124193: Electronic Apparatus Casing). In another method, a casing is provided, in which a metallic shielding case is integrally formed so that the number of processes for making the casing can be reduced and the mechanical strength can be improved (Japanese Unexamined Patent Publication (Kokai) No. 1-198099: Electronic Apparatus Casing). In still another method, a parabola aerial or antenna is provided, which is formed by means of in-mold forming (Japanese Unexamined Patent Publication (Kokai) No. 4-137804: Parabola Aerial and Manufacturing Method thereof). According to the former two methods, it is possible to improve the electromagnetic shielding property of the casing, however, consideration is not given at all to the mechanical strength, formability, anti-shock, and heat-radiating characteristics. Therefore, the above requirements cannot be completely satisfied.

In the in-mold forming method, metallic parts adhere to the formed resin when an anchor effect is used. When the end portions of the metallic parts are embedded in the resin, the resin layer holds the metallic parts, and when though-holes are formed in the metallic parts, the resin flows into the through-holes, so that an anchor effect can be provided. According to the anchor effect, metal and resin are integrally fixed and formed into one body due to the shrinkage of resin. Mechanical strength provided by the anchor effect is affected by the type of resin, for example, by the rigidity and shrinkage ratio of resin, the profile of the anchor, and the arrangement of the anchor. Therefore, in order to provide the anchor effect, it is necessary to investigate the construction of each product. Accordingly, manufacturing takes a long time. Further, when a molding is formed and cooled, shrinkage is caused in the resin, so that a gap is formed between the metallic parts and the resin. Therefore, not only the appearance of the product deteriorates but also dewing (or wetting) by water vapor condensation tends to occur, which is not preferable for an electronic apparatus casing. Therefore, it is necessary to adhere the metallic parts to the resin.

In order to solve the above problems, according to Japanese Unexamined Patent Publication No. 5-104638, a method of manufacturing a hybrid body of base material and resin is proposed, characterized in that: adhesive is coated on the surface of a metallic base so as to form an adhesive layer; the coated adhesive is hardened; and then, resin is provided on the surface of the hardened adhesive layer so that the metallic base can be integrated with the resin. According to this method, even when the resin is provided on the surface of the adhesive layer at high temperature and pressure, the adhesive layer does not flow out, so that the base and resin can be integrated into one body in a short period of time, and high adhesive force can be obtained.

SUMMARY OF THE INVENTION

It is an object of the present invention to apply the above method of manufacturing a hybrid body of base material and resin to the manufacture of an electronic apparatus casing.

It is another object of the present invention to provide a method of manufacturing an electronic apparatus housing or casing in which the formability is improved and the manufacturing process is made easy when a film-shaped adhesive agent or surface processing agent is used for the purpose of holding and protecting a base plate and electronic parts, wherein the strength of the electronic apparatus casing is high and the thickness is small so that it can be preferably applied to the casing for a portable type OA apparatus.

According to an aspect of the present invention, there is provided a method of manufacturing an electronic apparatus casing by which an electronic apparatus casing having at least a rib portion or a boss portion is manufactured by integrally forming metal and resin, the method of manufacturing an electronic apparatus casing being characterized in that: adhesive is coated on the (entire) surface of metal; after the coated adhesive has been dried, resin is injected from the rib or the boss portion onto the adhesive layer, so that hybrid forming is performed. When the rib portion or the boss portion is used for a passage of resin in the process of injection molding, the rib or the boss portion can be easily formed and material can be effectively utilized. The functions of a boss, rib and engagement portion are provided on the metallic parts, and, on the other hand, the resin and the metallic parts are strongly adhered by a heat-resistant rubber adhesive or a hot-melt adhesive so that the occurrence of a gap between the resin and the metallic parts can be prevented and the formability can be improved. As a result, it is possible to provide a casing for use in an electronic apparatus which is excellent in its rigidity, anti-shock and heat radiating characteristics, and, further, the casing is light weight.

According to another aspect of the present invention, there is provided a method of manufacturing an electronic apparatus casing characterized in that: metallic parts and resin are integrally formed when a film-shaped adhesive agent is disposed on the (entire) surfaces of metallic parts and then resin is injected onto the film-shaped adhesive agent. In the integration of metallic parts and resin, a film-shaped adhesive agent is provided on the (entire) surface of the metal, so that a uniform adhesive surface can be formed and contact resistance of the fluidity of molten resin or resin flow can be reduced in the process of injection molding. Accordingly, the formability can be improved. Since a film-like adhesive is used, a more uniform adhesive surface can be provided and forming can be stably performed. When injection molding is performed while a film-like adhesive is interposed between the metallic parts positioned on the (lower) metallic mold and the surface of the upper metallic mold, formation can be properly performed even when the surface is curved or uneven. When a metallic sheet onto which a film-like adhesive is thermally adhered with pressure is machined so as to make metallic parts, and when the metallic parts are subjected to injection molding, a more complicated hybrid casing can be manufactured.

According to still another aspect of the present invention, there is provided a method of manufacturing an electronic apparatus casing characterized in that: metallic parts and resin are integrally formed into one body, wherein the method of manufacturing an electronic apparatus casing includes a process for cleaning the metallic parts, a process for forming an organic film on the metallic surface by processing the metallic parts with a surface processing agent, and a process in which the metallic parts are arranged in a metallic mold, and the metallic mold constructed by at least lower and upper molds is fastened, and then resin is injected into the metallic mold.

According to a further aspect of the present invention, there is provide a method of manufacturing an electronic apparatus casing by in-mold forming in which aluminum and resin are integrally formed into one body by means of injection molding, the method of manufacturing an electronic apparatus casing including the steps of: cleaning aluminum parts for insert use; generating a hydrate on the (entire) surface of the aluminum parts when the aluminum parts are dipped in water; and injecting resin into a metallic mold after the aluminum parts have been set and fastened in the metallic mold. In these inventions, an organic film or an aluminum hydrate film is formed on the surfaces of the metallic parts. Therefore, the adhesive surface becomes uniform, and metal and resin can be integrated into one body without depending on the anchor effect. Consequently, metal and resin are adhered by the effect of a surface processing agent such as triazinethiol. Therefore, a strong casing can be formed. Since adhesion is not made by the construction, unlike common in-mold forming, it is not necessary to provide metallic parts having a specific profile. Without providing metallic parts having a specific profile, resin and metal can be easily integrated. When aluminum is used for the metal, weight of the casing can be reduced as compared with a casing having the same mechanical strength. Due to the foregoing, a light and strong hybrid casing for electronic apparatus use, with excellent rigidity and anti-shock characteristics can be easily manufactured.

BRIEF DESCRIPTION OP THE DRAWINGS

FIG. 4 is a perspective view of the pen-input type personal computer;

Figure 9:
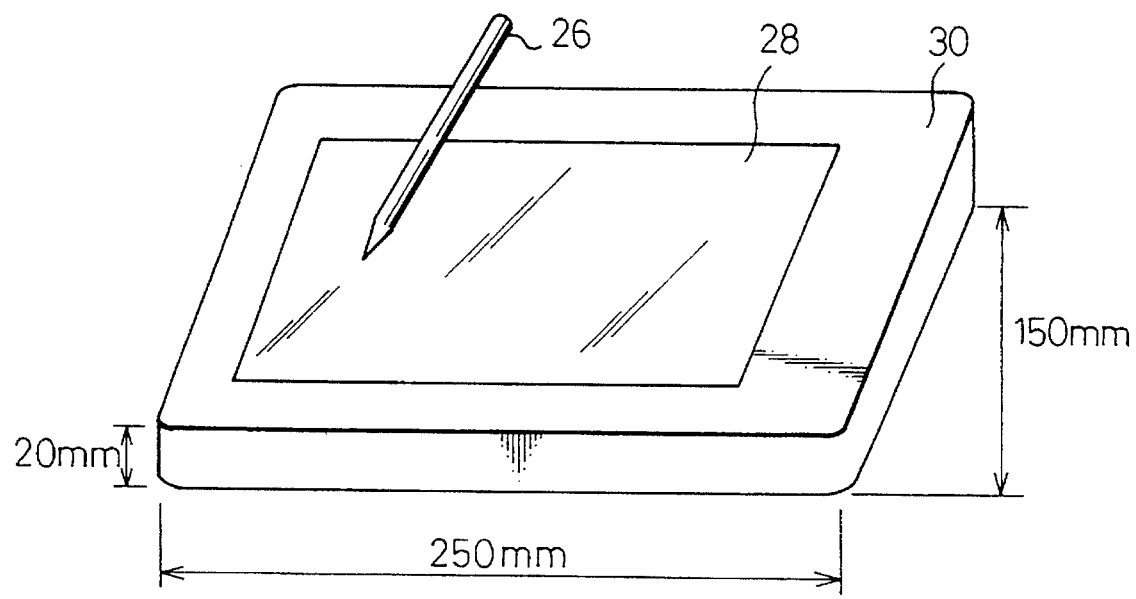
Figure 10:
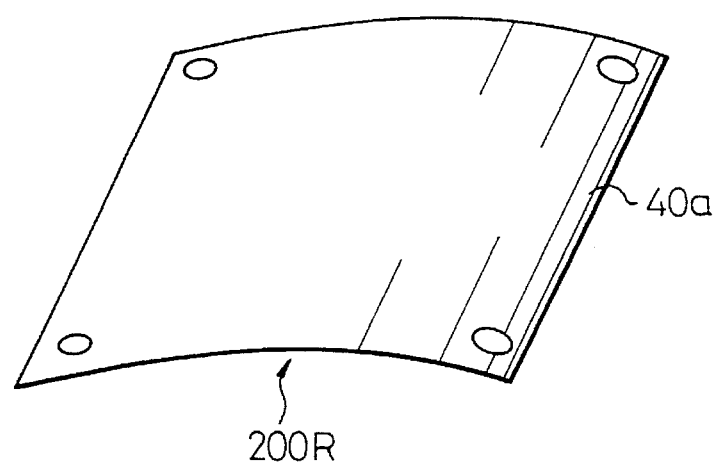
Figure 12:
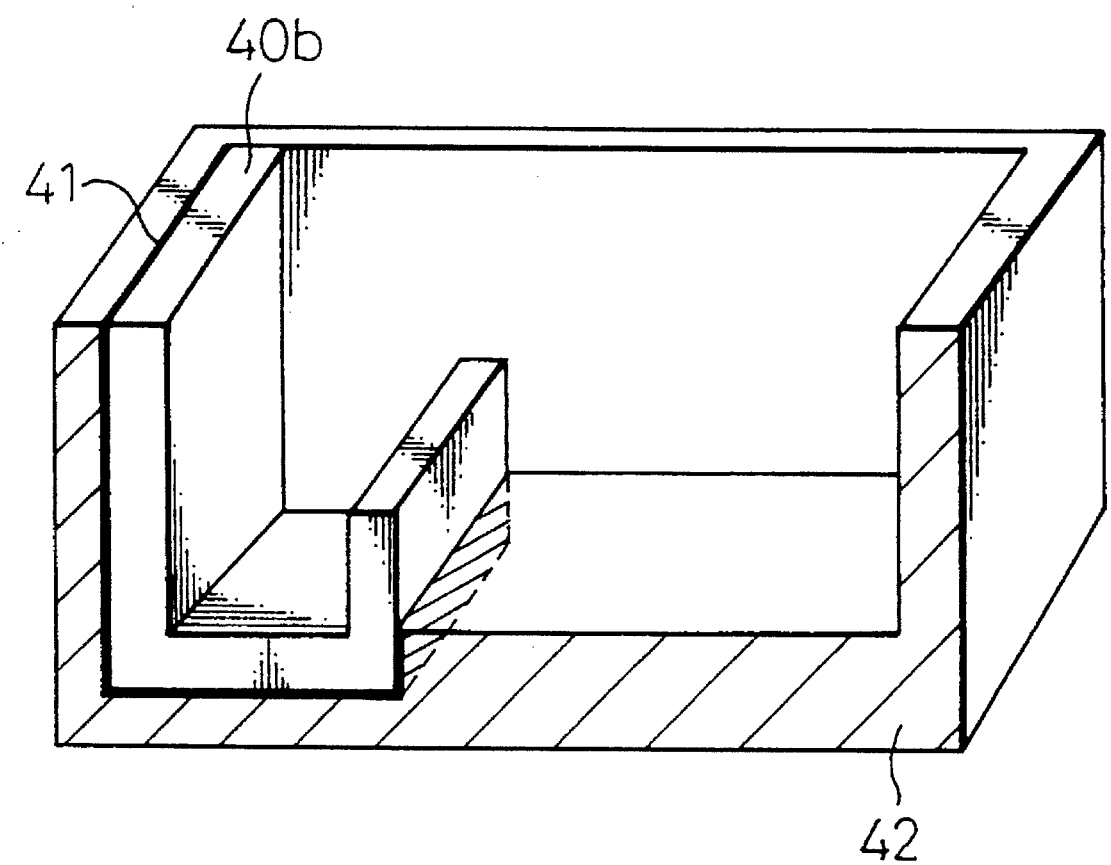
Figure 13A:
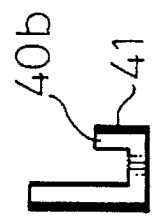
Figure 13B:
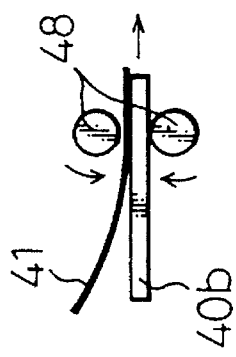
Figure 13C:
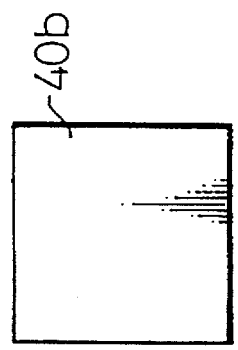
Figure 13D:
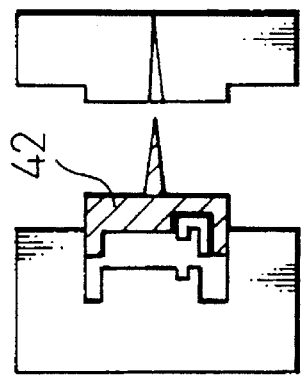
Figure 13E:
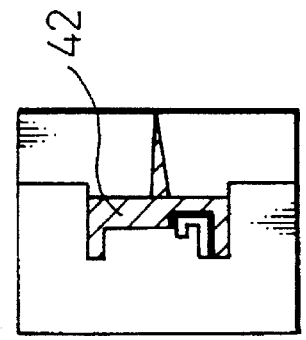
Figure 13F:
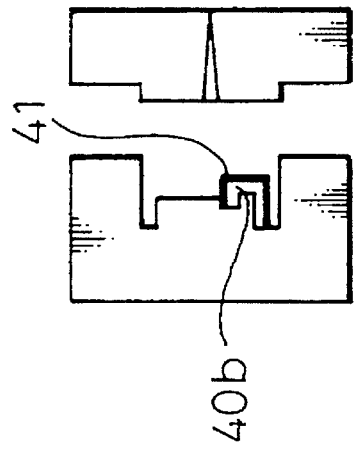
Figure 14:
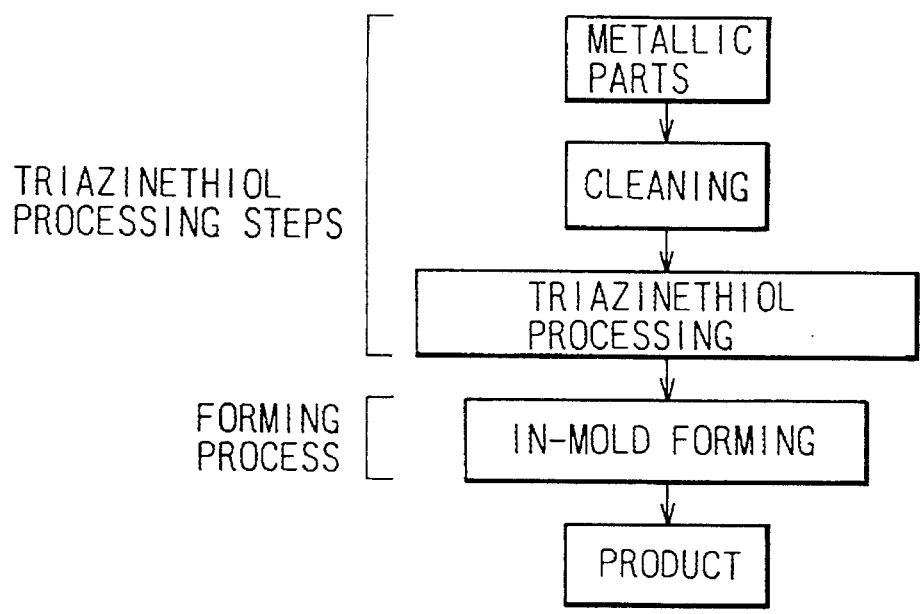
Figure 15A:
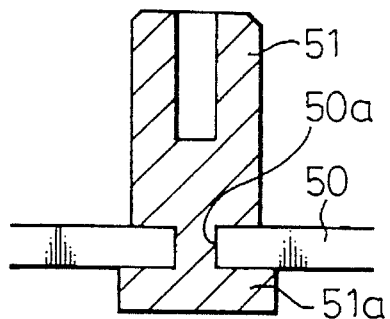
Figure 15B:
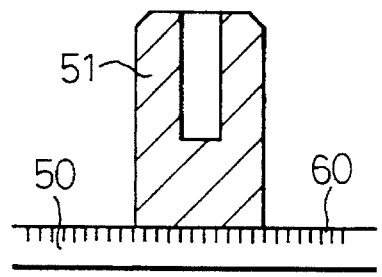
Figure 16A:
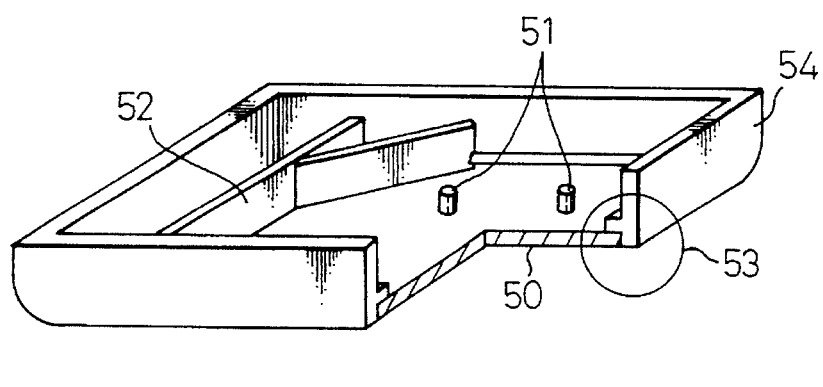
Figure 16B:
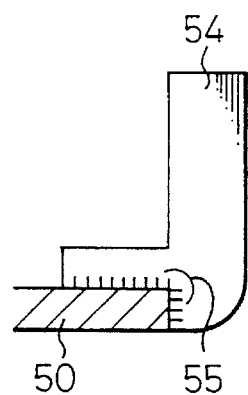
Figure 17A:
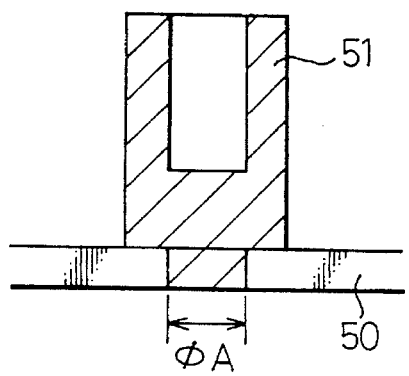
Figure 17B:
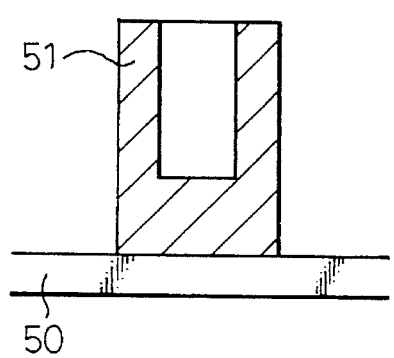

FIGS. 8(A) to 8(F) are views showing the manufacturing process of the fourth embodiment;

FIG. 9 is a perspective view of the pen-input type personal computer according to the fourth embodiment;

FIG. 10 is a perspective view of the aluminum sheet according to the fifth embodiment of the present invention;

FIGS. 11(A) to 11(D) are views showing the manufacturing process of the fifth embodiment;

FIG. 12 is a sectional view of the casing according to the sixth embodiment of the present invention;

FIGS. 13(A) to 13(F) are views showing the manufacturing process according to the sixth embodiment;

FIG. 14 is a block diagram of the manufacturing process according to the seventh to tenth embodiments of the present invention;

FIGS. 15(A) and 15(B) are views in which a comparison is made between the conventional example and the embodiment of the invention;

FIG. 16(A) is a perspective view of the casing according to the seventh embodiment, and FIG. 16(B) is a partial sectional view; and FIGS. 17(A) and 17(B) are views showing the boss for providing the strength of tapping.

DETAILED DESCRIPTION OF THE DRAWINGS

Before specific embodiments are explained with reference to the accompanying drawings, the summary of the invention will be explained as follows.

After heat-resistant rubber adhesive or hot-melt adhesive is coated on a metal sheet which has been degreased and washed, by means of a spray or roller coater, the boss, rib and engaging portion (peripheral rising portion) are integrally formed from general purpose resin, so that a casing can be formed.

The resin layer is integrally formed in a range from an edge portion of the metallic sheet to a rising portion, and when a portion of a predetermined size is added to this rising portion, the step portion can be removed and the edge portion of the metallic sheet can be formed flat. Therefore, this casing can be applied to various designs. Also, it is sufficient that only one side is subjected to adhesive processing, so that the working efficiency can be improved.

Compared with a casing made only of resin, a casing in which resin and metal are integrated into one body is greatly improved in the static load strength and anti-shock strength, and the heat radiating property is also improved.

When the rib is used for the passage of resin in the process of forming a casing, the boss and others on the metallic sheet can be easily formed, and the material can be effectively used. For the purpose of positioning the boss and rib with respect to the metallic sheet, through-holes corresponding to the positions of the rib and boss are made on the metallic sheet. In this way, the dimensional accuracy can be improved and the mechanical strength can be increased. When resin is injected through a protruding portion close the through-hole of the metallic sheet, the resin flows into this through-hole and a resin portion can be formed on the opposite side with respect to the metallic sheet. A resin injection gate of the mold for injection molding may be provided close to the through-hole of the metallic sheet at the protruding portion.

The type of metallic sheet is not particularly limited, however, aluminum or aluminum alloy is preferably used because aluminum or aluminum alloy is light and has a high mechanical strength, and further it can be easily machined. Thickness of the metallic sheet is preferably 0.3 to 0.6 mm. The reason is as follows:

When the metallic sheet is thinner than 0.3 mm, a sufficient reinforcing effect can not be provided by the metallic sheet. When the metallic sheet is thicker than 0.8 mm, a ratio of metal to resin in the casing is increased, so that the weight of the casing is increased.

The method of manufacturing a casing from resin includes a process for previously degreasing and cleaning metallic parts, a process for coating heat-resistant rubber adhesive using a spray, and a process for injecting general purpose resin into the metal mold in which the metallic parts have been set.

In the degreasing and cleaning process, metallic parts are dipped in an organic solvent such as acetone which is provided in a tank, and subjected to ultrasonic cleaning using an ultrasonic cleaner, so that dust, oil, grease, any other impurities, and a denatured layer, can be removed. When the metallic parts are further subjected to acid or alkali processing, greater effects can be obtained.

In the adhesive coating process, when the washed metallic parts are coated with heat-resistant rubber adhesive using a spray, the adhesive layer thickness is uniformly controlled. When the metallic parts are dried and the solvent is volatilized, the adhesive is bonded with the metal through hydrogen bonding, or the adhesive is partially cross-linked, so that the adhesive becomes like rubber and is dry to the touch. Therefore, the adhesive can be easily handled, and in the case of injection molding, it is prevented from flowing out.

Next, in the injection molding process, the metallic parts subjected to the adhesive processing are set in a metallic mold, and general purpose resin is injected into the metallic mold. When general purpose resin is used for the boss, rib and engaging section (rising section), the rigidity of which is required to be high, the metallic base plate is strongly held and the casing is strongly combined, and further resin and adhesive are bonded through hydrogen bonding or partially cross-linked, so that a casing for high adhesive strength can be provided. Also, since the heat-resistant adhesive has flexibility and resilience, the casing is effective with respect to its anti-shock property and vibration and deformation of the casing can be prevented. When the aforementioned in-mold forming method is employed after the metallic parts have been subjected to surface processing, the metallic parts adhere to resin more strongly and the formability can be improved.

When the polyurethane hot-melt adhesive is hardened after melting and coating, the adhesion is lost, so that the works can be easily performed. At the time of forming, the hot-melt adhesive is melted again, and after coating, it is completely hardened. Accordingly, a casing for high strength and rigidity can be provided.

Figure 5A:
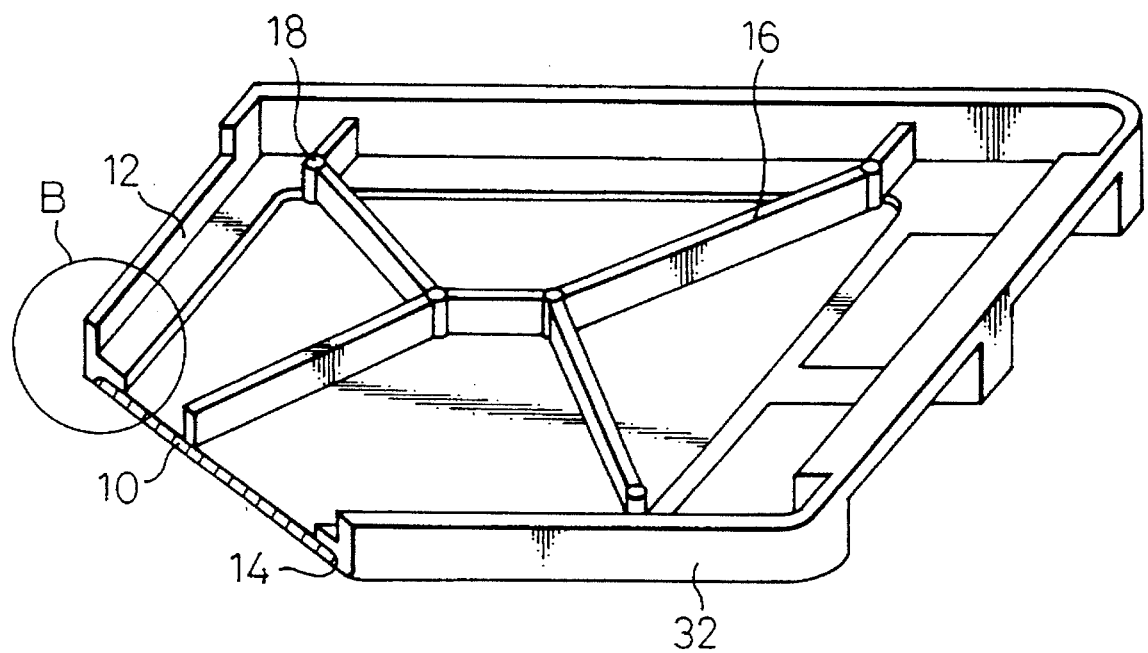
FIG. 5(A) is a perspective view of the bottom cover of the casing for the pen-input type personal computer when hybrid forming has been conducted.
Figure 5B:
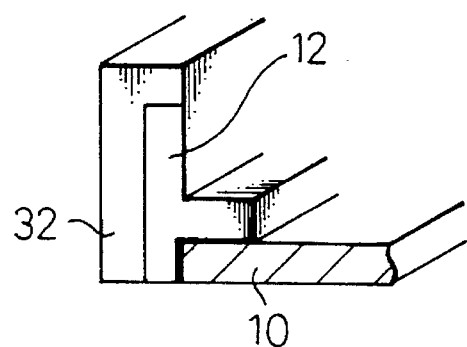
FIG. 5(B) is a partial enlarged view shown by B in FIG. 5(A)

When a flexible thermoplastic elastomer 32 as shown in FIG. 5(B) is subjected to hybrid forming in such a manner that it covers the molding, a strong casing can be provided, by which an impact force can be absorbed by the case when the casing is dropped, so that the inner electronic parts can be protected from the impact force or impact shock.

EMBODIMENT 1

Figure 1:
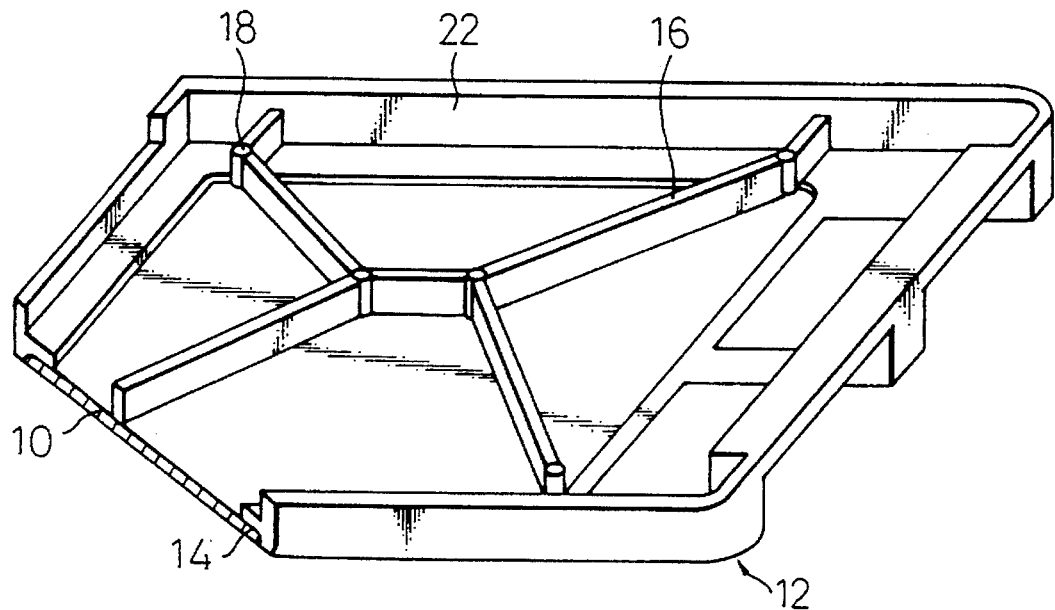
FIG. 1 is a perspective view of the bottom cover of the casing for the pen-input type personal computer.
Figure 2:
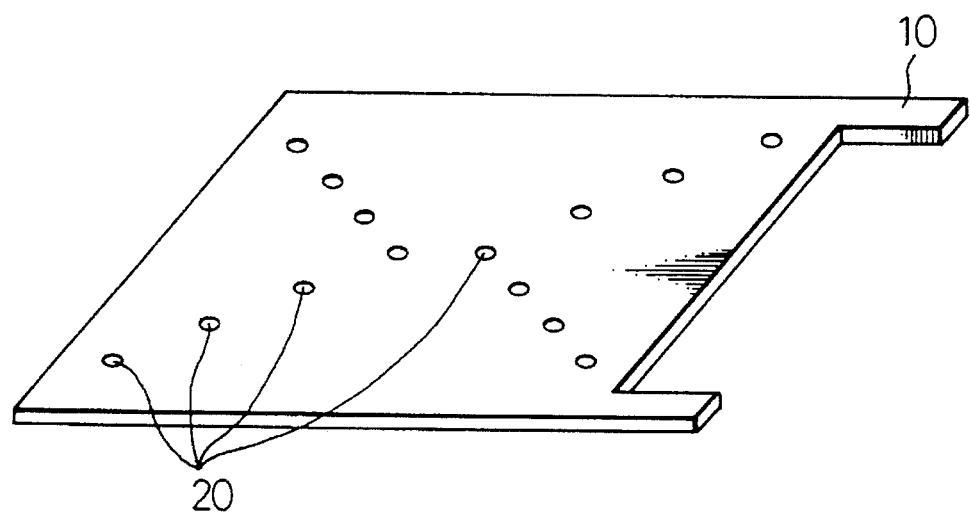
FIG. 2 is a perspective view of aluminum parts.
Figure 3A:
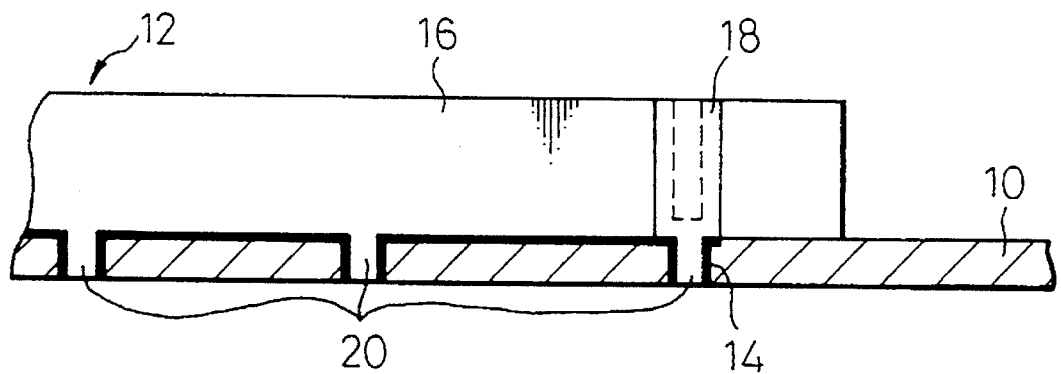
FIG. 3(A) is an enlarged sectional view of the boss and rib shown in FIG. 1.
Figure 3B:
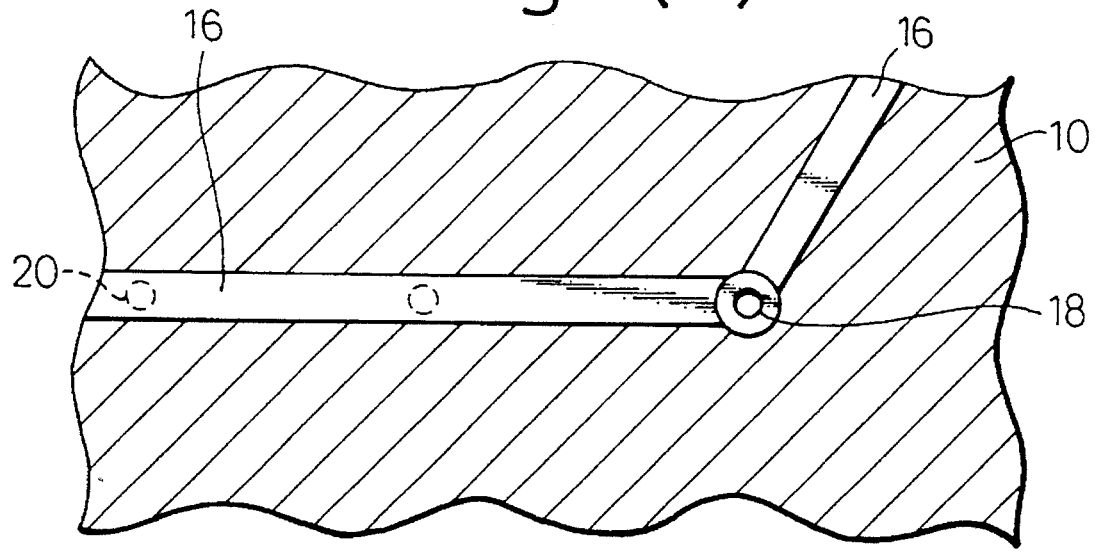
FIG. 3(B) is an enlarged plan view of the boss and rib.
Figure 3C:
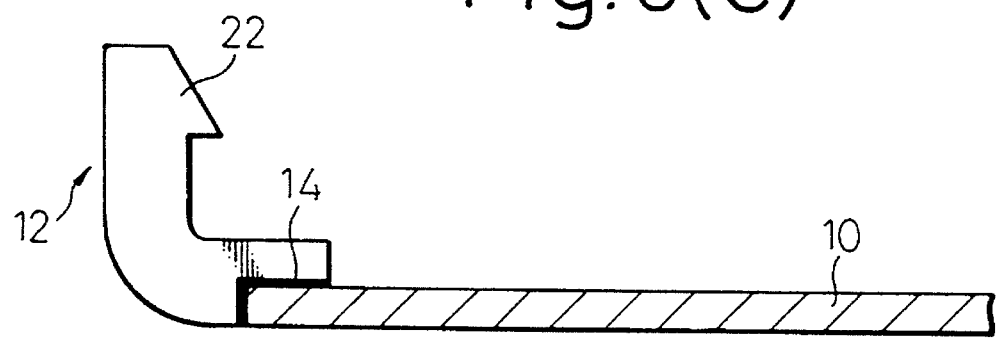
FIG. 3(C) is an enlarged sectional view of the end portion of the product.

FIG. 1 is a perspective view of the bottom cover of the casing for a pen-input type personal computer which is the first embodiment of the present invention. In order to show the inner construction, a portion is shown in a sectional view. FIG. 2 is a perspective view showing a metallic sheet illustrated in FIG. 1. FIG. 3(A) is an enlarged sectional view of the boss and rib shown in FIG. 1, FIG. 3(B) is an enlarged front view of the boss and rib portions, and FIG. 3(C) is an enlarged sectional view of the end portion of the molding.

First, an aluminum sheet 10 shown in FIG. 2, the thickness of which was 0.6 mm, and the dimensions of which were 150×250 mm, was degreased and washed using acetone and ethanol. After the aluminum sheet 10 had been dried, nitryl rubber adhesive 14 was coated on the aluminum sheet 10 using an air spray so that the adhesive was uniformly coated and 20 µm thick. In order to prevent the coated adhesive from flowing, the aluminum sheet 10 which had already been subjected to adhesive processing was dried for 10 minutes at 80° C., so that the solvent contained in the adhesive 14 was volatilized and the adhesive became to a condition similar to rubber.

Next, the metallic mold was opened and the aluminum plate 10 was attached to the metallic mold. After that, the mold was fastened, and then ABS resin 12 (Stylac VGB20—Trademark—, Asahi Chemical Industry Co., Ltd.), which is a general purpose plastic, was injected into the metallic mold, so that a resin layer composed of the boss 18, rib 16 and engaging portion 22 was integrally formed. The forming conditions were as follows. Temperature of the resin was 230° C., setting pressure of injection was 500 kgf/cm², and injection time was 1 second.

Since the rib 16 was used for the passage of resin in this molding, and the boss 18 was easily formed in the center of the aluminum plate 10, the forming pressure was reduced and the residual stress was also reduced. Consequently, deformation was reduced after forming.

Using the casing provided in the manner described above, a pen-input type personal computer shown in FIG. 4 was manufactured. In FIG. 4, numeral 26 is an input pen, numeral 28 is a liquid crystal image plane or panel, and numeral 30 is a casing. A central concentrated load of 10 kgf/cm² was applied to this casing. As a result, neither the casing nor apparatus was damaged. Even when the casing and apparatus were dropped from a position 1 m high onto a concrete floor, the casing was not damaged and the apparatus was quite safe.

As a comparative example, a pen-input type personal computer was manufactured in the same manner as described before under the condition that the aluminum plate 10 was not used and only ABS resin was used for the casing. In this example, when a central concentrated load of 10 kgf/cm² was applied, the casing was cracked, and the apparatus was damaged. In order to check the anti-shock property, the personal computer was dropped from a position 1 m high onto a concrete floor. As a result, the casing was damaged and the protective glass on the liquid crystal image plane was also damaged.

Host of the portable electronic apparatus such as pen-input type personal computers include a closed casing. Concerning the closed casing, heat generated inside the casing necessarily penetrates the casing wall and disperses or radiates into the atmosphere. Accordingly, heat resistance between the casing surface and the atmosphere, and heat resistance between the inside heating element and the casing are main factors to determine the temperature rise. Therefore, a comparison was made between the casing for the embodiment of the present invention in which resin and aluminum were integrated into one body, and the casing for the above comparative example in which casing was made only of resin. The inner apparatus unit was assembled into the casing and activated, so that the temperature was raised. The temperature of the CPU section in the casing for the comparative example was raised by 10° C. On the other hand, temperature of the CPU section in the casing for the embodiment of the present invention was raised by 4° C., which is not even half of the temperature rise of the CPU section in the casing for the comparative example. As described above, according to the method of the embodiment of the present invention, a metal of high heat conductivity is used, and the metal comes into contact with the air outside the casing surface, so that the temperature rise of the inner apparatus unit can be suppressed. Therefore, the method of the embodiment of the present invention is effective from the viewpoint of the heat radiating property.

A bottom cover of a casing for the pen-input type personal computer was formed by the same method as described above, however, adhesive was not coated in this method. As a result, adhesion was not made between the resin and the aluminum, and forming was not performed properly.

EMBODIMENT 2

In this embodiment, the adhesive used in Embodiment 1 was replaced with polyurethane hot-melt adhesive. After the aluminum plate 10 had been washed, melted polyurethane hot-melt adhesive was uniformly coated with a roller coater so that the coating thickness was 20 µm. While being cooled, the coated adhesive was hardened, and when forming was performed, the adhesive was melted again and adhered. In the same manner as that described before, a pen-input type personal computer was manufactured. Even when a central concentrated load of 10 kgf/cm² was applied, both the casing and apparatus were maintained in a normal condition, and further an amount of deformation of the casing was reduced by ⅔, so that a casing for high rigidity was provided. Even after the personal computer had been dropped from a height of 1 m high onto a concrete floor, the apparatus was not damaged at all, however, the engagement of the casing was slightly disconnected.

As a comparative example, only an aluminum sheet 0.2 mm thick was used for the casing, and a pen-input type personal computer was manufactured, and then a central concentrated force of 10 kgf/cm² was applied. As a result of the experiment, the protective glass on the liquid crystal image plane was damaged.

As another comparative example, a casing for the pen-input type personal computer was formed by the same method as that of Embodiment 2, however, adhesive was not coated in this example. As a result, a gap was formed between the aluminum plate and resin. Therefore, it was impossible to use the casing for the pen-input type personal computer.

In the case where importance is attached to the prevention of deformation and shock, it is effective to use heat-resistant rubber adhesive made of nitryl rubber or chloroprene rubber. In the case where importance is attached to the improvements in mechanical strength and rigidity, it is effective to use hot-melt adhesive of polyurethane.

In the embodiment of the present invention, hot-melt adhesive, which is a thermoplastic resin, is used. Therefore, the chemical decomposition property is high, and it can be easily recycled. Accordingly, this is appropriate in view of the environmental problems of the earth.

EMBODIMENT 3

In the casing shown in FIG. 1, a thermoplastic elastomer 32 of styrene (TUFTEC S2974, —Trademark®— manufactured by Asahi Kasei Co.) was injected as illustrated in FIG. 5, and hybrid forming was conducted so that the overall wall thickness could be 1 mm (FIGS. 5(A) and 5(B)). The forming conditions were as follows:

The resin temperature was 220° C., the setting pressure of injection was 400 kgf/cm$^2$, and the injection time was 1 second.

Using the casing provided in the manner described above, a pen-input type personal computer shown in FIG. 4 was manufactured, and a central concentrated load of 10 kgf/cm$^2$ was applied. As a result, both the casing and the apparatus were maintained in a normal condition. Although the personal computer was dropped from a height of 1.5 m onto a concrete floor, the casing was not damaged and the apparatus was maintained in a normal condition. The surface of the casing was maintained in a rubber-like condition, so that the sense of touch was good, and the friction coefficient was high. Therefore, the surface is not slippery, and the safety property was improved.

Concerning the resin, when general purpose resin was not injected in a hybrid forming, and only thermoplastic elastomer of styrene (TUFTEC S2974®, manufactured by Asahi Kasei Co.) was injected into the mold to manufacture the casing, as a result, since the rigidity of thermoplastic elastomer of styrene was low and its resilience was high, so the printed board assembled in it was not properly held and the casing was not engaged. Therefore, it was impossible to apply the casing to the personal computer.

When chloroprene rubber adhesive was used for the adhesive and thermoplastic polyester elastomer (Hytrel 4057® manufactured by Toray and Dupont Co.) was used for the thermoplastic elastomer, the same effect was provided i.e., it was impossible to apply the casing to the personal computer.

When the thermoplastic elastomer was injected in a hybrid form as shown in this embodiment, the anti-shock property was greatly improved as compared with the first and second embodiments.

SUMMARY OF EMBODIMENT 4 TO 6

In the process of integration of metallic parts and resin, after the metallic parts are degreased and washed, a film-like adhesive is thermally adhered onto the metallic parts. When these metallic parts are subjected to injection molding, a strong adhesion can be provided. Since the film-like adhesive is thermally adhered beforehand, the process is simple, and a more uniform adhesive surface can be formed. Therefore, the contact resistance of the fluidity with respect to resin flow is reduced in the injection molding process. Accordingly, the formability can be improved.

When injection molding is conducted after a film-like adhesive has been interposed between the metallic parts positioned in the metallic mold and the surface of the upper metallic mold, not only flat metallic parts but also a curved (R) surface and an uneven surface can be uniformly adhered.

Also, after a metallic sheet has been degreased and washed, a film-like adhesive is thermally adhered onto the metallic sheet, and the metallic sheet is machined so as to make metallic parts. When these metallic parts are subjected to injection molding, more complicated products can be produced, and strong adhesion can be provided.

EMBODIMENT 4

Figure 6:
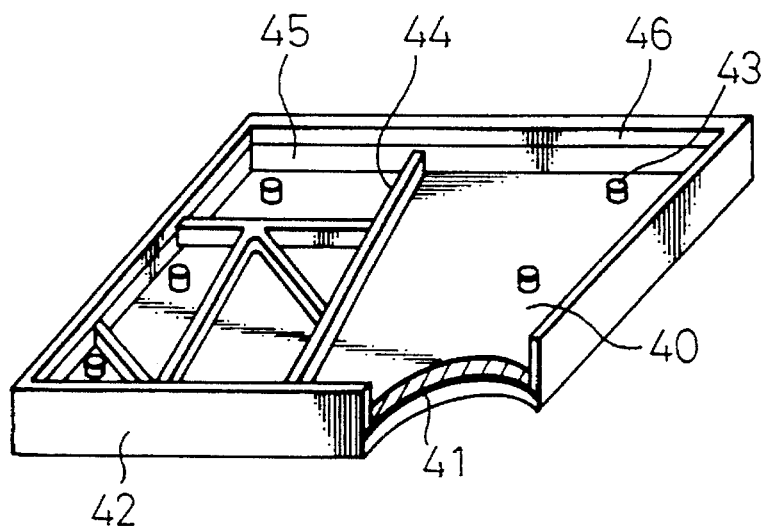
FIG. 6 is a perspective view of the bottom cover of the casing according to the fourth embodiment of the present invention.
Figure 7:
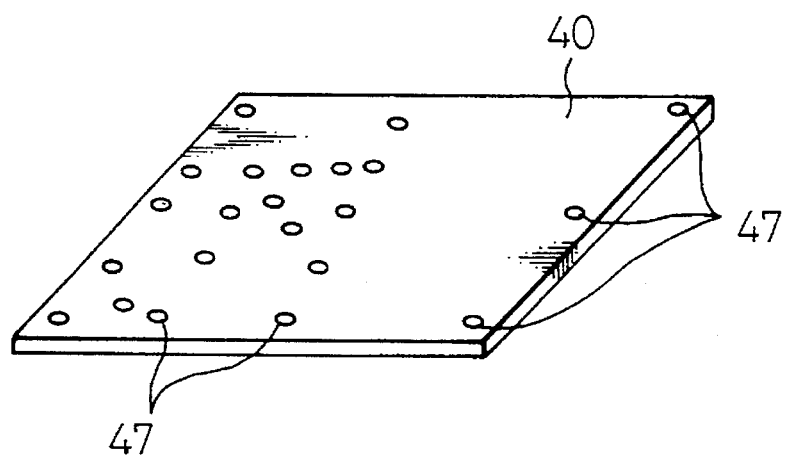
FIG. 7 is a perspective view the aluminum sheet according to the fourth embodiment.
Figure 8A:
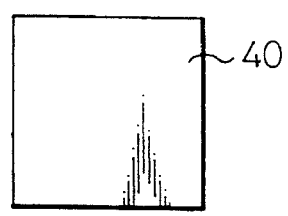
Figure 8B:
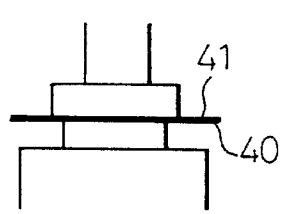
Figure 8C:
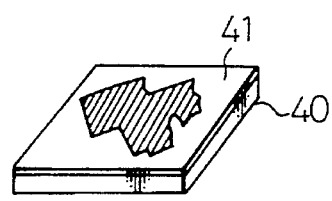
Figure 8D:
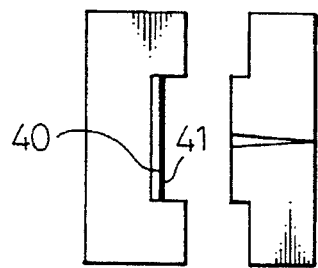
Figure 8E:
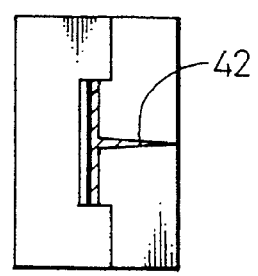
Figure 8F:
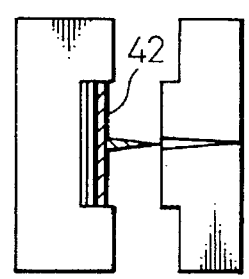

FIGS. 6 to 9 show the fourth embodiment of the present invention. FIG. 6 is a perspective view of the bottom cover of the casing for a pen-input type personal computer which is the fourth embodiment of the present invention. In order to show the inner construction, a portion is shown in a sectional view. FIG. 7 is a schematic illustration showing the metallic sheet in FIG. 6.

FIGS. 8(A) to 8(F) are views showing the forming process in the fourth embodiment. First, the aluminum sheet 40 (dimensions: 150×250 mm), the thickness of which was 0.4 mm, was degreased and washed using acetone and ethanol (shown in FIG. 8(A)). After the aluminum sheet 40 had been dried, a film-like adhesive 41 of a thermoplastic type of ethylene copolymer was thermally adhered with pressure by means of a thermal press (shown in FIG. 8(B)). When a film-like adhesive 41 was used, a more uniform adhesive surface was provided (shown in FIG. 8(C)). Next, the metallic mold was opened, and the aluminum sheet 40 was attached (shown in FIG. 8(D)). After the metallic mold had been fastened, the ABS resin 42 (Stylac VGB20®, manufactured by Asahi Kasei Co.) for general purpose was injected into the metallic mold (shown in FIG. 8(E)). In this way, the resin portion 42 including the boss 43, rib 44, engaging portion 45 and outer frame portion 46, was formed integrally with the aluminum sheet 40 (shown in FIG. 8(F)). Forming was conducted under the condition that the temperature of resin was 230° C. the setting pressure of injection was 300 kgf/cm$^2$, and the injection time was 1 second. Since the film-like adhesive 41 was used, the contact resistance of the fluidity with respect to resin flow was reduced in the process of injection molding, so that the injection pressure was maintained low and forming was conducted in a more stable condition. In this connection, as illustrated in FIG. 7, through-holes 47 are formed at positions corresponding to the bosses 43 and the ribs 44. Accordingly, these bosses 43 and ribs 44 are formed when the resin flows onto the opposite side of the aluminum plate through the through-holes 47 in the process of injection forming.

Using thus obtained casing, a pen-input type personal computer was manufactured as illustrated in FIG. 9, and dropped from a position 1 m high onto a concrete floor. The casing was not damaged, and the apparatus was maintained in a normal condition and even when a central concentrated load of 10 kgf/cm$^2$ was applied, both the casing and apparatus were maintained in a normal condition.

EMBODIMENT 5

Figure 11A:
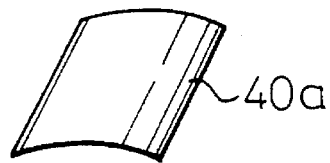
Figure 11B:
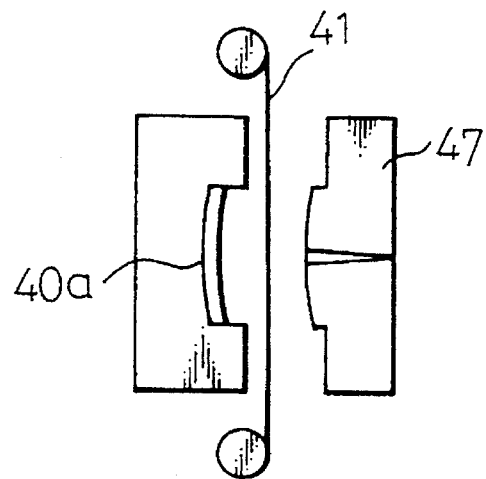
Figure 11C:
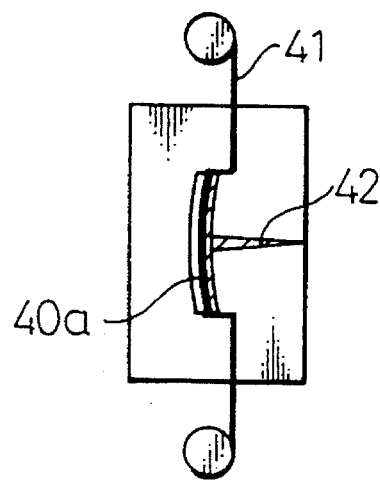
Figure 11D:
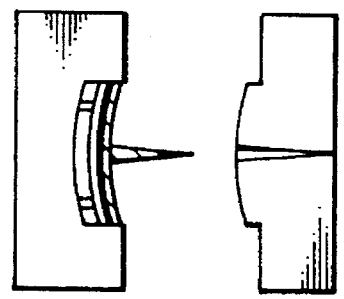

FIGS. 10 and 11(A) to 11(D) show the fifth embodiment of the present invention. The fifth embodiment is to provide a method by which metallic parts having a curved surface can be effectively subjected to in-mold forming. An aluminum sheet 40a of 60×60×0.5 mm having a curved surface, the radius of curvature (R) of which was 200 mm as illustrated in FIG. 10, was subjected to in-mold forming. ABS resin was used for the forming resin, and a thermoplastic type film-like ethylene copolymer adhesive was used for the adhesive. The forming process 2 of this fifth embodiment is shown in FIGS. 11(A) to 11(D). An aluminum sheet 40a was degreased and washed and was set in the metallic mold. A film-like adhesive 41 is provided and fastened between the aluminum sheet 40a and the upper mold 47 as illustrated in FIG. 11(A) and FIG. 11(B). Then the ABS resin 42 is injected into the mold (shown in FIG. 11(C)). In this way, the molding was formed (shown in FIG. 11(D)). Even when the aluminum sheet 40a having a curved surface was formed, the adhesive strength between the ABS resin 42 and the aluminum sheet 40a was high. Consequently, according to the method of this embodiment, it is possible to form metallic parts having a curved surface so as to manufacture a casing. Of course, it is possible to further improve the adhesive strength by adding the anchor effect between the resin and the metallic parts when the surface of the aluminum sheet 40a is subjected to surface grinding.

EMBODIMENT 6

FIGS. 12 and 13(A) to 13(F) show the sixth embodiment of the present invention. FIG. 12 shows a casing in which an aluminum sheet 40b is subjected to in-molding. ABS resin was used for the forming resin, and a thermoplastic type film-like ethylene copolymer adhesive was used for the adhesive 41. The in-mold forming process of this embodiment is shown in FIGS. 13(A) to 13(F). A degreased and washed aluminum sheet 40b (shown in FIG. 13(A)) and a film-like adhesive 41 were thermally adhered with pressure using a heat roller 48 (shown in FIG. 13(B)). Then the aluminum sheet 40b was machined so that a metallic part made of aluminum was manufactured (shown in FIG. 13(C)). This aluminum part was set in the metallic mold (shown in FIG. 13(D)), and resin 42 was injected (shown in FIG. 13(E)). After that the hybrid casing was taken out from the metallic mold (shown in FIG. 13(F)). According to this embodiment, the following was confirmed:

Even when protruding and cutaway portions located in the periphery of the casing are subjected to injection molding, a high adhesive strength can be provided between the resin and metallic parts in the same manner as that of a flat portion. When the aluminum parts are subjected to grinding, the anchor effect can be added, which is effective for improvement in the adhesive strength.

SUMMARY OF EMBODIMENTS 7 TO 10

FIG. 14 is a flow chart showing the formation of a casing in Embodiments 7 to 10. First, the metallic parts are dipped in an organic solvent such as acetone or washed in acid, so that the dirt and oxide film on the metallic surface are removed. After that, the metallic parts are dipped in a triazinethiol solution of a predetermined concentration for a predetermined period of time. Then, this metallic parts processed in the triazinethiol solution is placed in a metallic mold, and a general purpose resin such as ABS resin, or an engineering plastic such as polyimide is injected into the metallic mold, so as to conduct in-mold forming. In this way, the process is completed, In the above triazinethiol processing, the processing is so simple that the metallic parts need only be dipped in a triazinethiol solution. Also, the processing time is so short that it only requires several to several tens of minutes. In this way, the processing is simple, and the productivity is very high. In the in-mold forming process, the metallic parts are set in the metallic mold, and resin is injected into the metallic mold. That is, this process is simple. Further, it is not necessary to design a specific structure such as an integration of resin and metallic parts using the conventional anchor effect. For example, in the conventional example, when a protruding resin boss 51 or a rib (not shown) is provided on the surface of the metal sheet 50 as illustrated in FIG. 15(A), a hole 50a is formed on the metallic sheet 50 so that this hole 50a functions as a hook portion 51a at which the molded resin portion is hooked. However, in this embodiment, the surface of the metallic sheet 50 is subjected to triazinethiol processing 60 as illustrated in FIG. 15(B), and it is not necessary to provide a hole at which the molded resin portion is hooked. Consequently, the resin hooking portion does not exist on the outside, so that the appearance of the manufactured casing is excellent and the mechanical strength is high. Further, it is not necessary to provide a coating device for coating adhesive. Without providing the coating device, a uniform adhesive layer can be formed and quality can be improved. Further, an organic film is formed on the metallic surface, so that the coating layer positively adheres onto the metallic surface, and the coating process can be simplified. A suitable triazinethiol component for use in accordance with the invention, for example, is 6-sodium mercaptide-2,4-dimercaptide 1,3,5-triazine.

When consideration is given to the cost, fluidity, anti-shock property and ability to react with triazinethiol, ABS resin is most appropriate for the resin to form the casing, however, it should be noted that the resin is not limited to the specific material. For example, other resins such as a polymer alloy of ABS resin and polyamide may be used.

Copper of high mechanical strength or aluminum of low density is most preferably used for the metallic parts. However, the reaction with triazinethiol tends to be obstructed by the dirt and oxide film on the metallic surface. Therefore, it is necessary to clean the metallic surface in pretreatment. However, it is not necessary to prepare a specific processing solution, and conventional oxidization processing may be available. In Embodiments 7 to 10 explained below, the metallic parts are dipped in dilute sulfuric acid of 10 to 20% for several minutes.

EMBODIMENT 7

FIG. 16(A) is a perspective view of the bottom cover of the casing for a pen-input type personal computer which is the seventh embodiment of the present invention.

First, an aluminum sheet 50 to 0.5 mm thickness (dimensions: 150×250 mm, JIS A5052) was subjected to ultrasonic cleaning in acetone. After that, an oxide film was removed when the aluminum sheet 50 was dipped in dilute sulfuric acid of 15% at 60° C. Then, the aluminum sheet 50 was dipped in a triazinethiol water solution of 0.02% at 60° C. and washed in water and ethanol. After cleaning, the aluminum sheet 50 was dried. In this case, ZISNET TTN (brand name of a product manufactured by Sankyo Kasei Co.) was used as triazinethiol.

Next, after the metallic mold (not shown) had been opened and the aluminum sheet 50 had been set in the metallic mold, the metallic mold was fastened. Then, ABS general purpose resin (Stylac VGB20 manufactured by Asahi Kasei Co.) was injected for forming, so that a resin portion 54 including a boss 51, rib 52 and Joint portion 53 was formed. The forming conditions were as follows:

The resin temperature was 230° C., the setting pressure of injection was 700 kgf/cm$^2$, and the metallic mold temperature was 80° C.

Using thus obtained casing, a pen-input type personal computer was manufactured as illustrated in FIG. 9, and dropped from a height of 1 m onto a concrete floor. The casing was not damaged, and the apparatus was maintained in a normal condition. Even after a central concentrated load of 10 kgf/cm² had been applied, both the casing and apparatus were maintained in a normal condition.

As a comparative example, a pen-input type personal computer was manufactured by a similar method as that described above, however, only ABS resin was used (that is, triazinethiol processing was not conducted) in this example. The personal computer was dropped from a height of 1 m onto a concrete floor. The casing was not damaged. However, when a central concentrated load of 10 kgf/cm² was applied, the glass portion of the display unit was damaged.

In addition, after the aluminum sheet 50 had been washed, it was dipped in water at 50° to 80° C. Then, an aluminum hydrate 55 was generated on the surface of the aluminum sheet 50 as illustrated in FIG. 16(B). This aluminum hydrate helped the resin to adhere to the metallic sheet, so that the aluminum hydrate provided the same effect as that of a coupling agent. In this example, pure water was used, and the aluminum sheet 50 was dipped in it for 10 minutes.

EMBODIMENT 8.

An aluminum sheet as used as, in Embodiment 7, the adhesive area of which was 0.64 mm², was used as a tensile test piece and was subjected to a tensile strength and adhesion test. After acid processing, the aluminum sheet was dipped in water at 60° C. for 10 minutes. After the aluminum sheet had been dried, it was formed into the test piece. Stylac 191F (brand name: Stylac 191F, manufactured by Asahi Kasei Co.) was used for the resin. In this connection, the temperature of the mold was 70° to 100° C.

Results of the tensile test are shown as follows.

Relation between the mold temperature and the adhesive strength

| Mold temperature (°C.) | 70 | 80 | 90 | 100 |
|---|---|---|---|---|
| Adhesive strength (kgf/cm²) | 20 | 48 | 56 | 71 |

EMBODIMENT 9

The same experiment as that of Embodiment 7 was performed, wherein ABS-PC alloy (brand name: MONKALLOY manufactured by Monsanto Kasei Co.) and polyamide (brand name: CX3000 manufactured by UNITIKA Co.) were used for the injection resin. The casing and apparatus were not damaged in the drop test and the concentrated load test.

While ABS resin was used for the resin, the metallic parts material was changed to Al-Cu according to JIS (Japanese Industrial Standard) A2011. Under the above condition, the same experiment was performed. As in Experiment 7, the casing was not damaged.

EMBODIMENT 10

A boss 51 shown in FIGS. 17(A) and 17(B) was formed, and subjected to a tapping strength test. In this case, the bose was provided with a through-hole, the diameter of which was 2 mm and 4 mm. A durability test was made in the following manner:

With respect to the loads of 2, 4 and 6 kgf, the screw was driven into the boss 8 times, so that the durability of the boss was tested.

Results of the test are shown in Table 1 as follows. A boss having a large through-hole was not capable of withstanding the load of 6 kgf. Mechanical strength of a boss having a small through-hole and that of a boss having no through-hole were high. Especially, in the case of the boss having no through-hole, the screw portion was damaged by the load of 6 kgf. Therefore, it was impossible to continue the measurement exceeding the load of 6 kgf, that is, a sufficient mechanical strength was provided to the boss.

That is, "Impossible to measure" shows that the measurement can not be continued due to the breakdown of the screw portion of the boss.

TABLE 1

| Through-hole Load | Tapping Strength | | |
|---|---|---|---|
|  | No | 2 mm | 4 mm |
| 2 (kgf) | 8 (times) | 8 | 8 |
| 4 (kgf) | 8 (times) | 8 | 3 |
| 6 (kgf) | impossible to measure | 3 | 0 |

We claim:

1. A method of manufacturing a composite hybrid housing or casing for an electronic apparatus, said housing or casing including a metal component and a resin component, said resin component having a rib or boss portion, said method comprising:

coating a flowable adhesive on a surface of said metal component;

allowing said adhesive to dry; and joining said metal and resin component by injection molding said resin component onto said metal component and into contact with said dried adhesive, said resin being introduced onto said metal component and into contact with said adhesive using an area where said rib or said boss is to be formed as a flow path.

2. The method according to claim 1, wherein said adhesive comprises a heat resistive rubber adhesive.

3. The method according to claim 1, wherein said adhesive comprises a polyurethane hot melt adhesive.

4. The method according to claim 1, wherein said metal component comprises an aluminum or aluminum alloy sheet having an average thickness of 0.3 to 0.8 mm.

5. The method according to claim 1, wherein said metal component comprises a flat portion having a periphery, and the resin component comprises a rib portion, a boss portion and a rising portion located at the periphery of the flat portion, said rib and boss portions being in contact with the metal component, and the rising portion extending outwardly from said periphery of the flat portion.

6. The method according to claim 5, wherein said metal component includes a through-hole positioned to enable resin flow at a location corresponding to the rib or boss portion.

7. The method according to claim 5, wherein is included a step of forming a thermoplastic elastomer in a hybrid manner on an outer circumference of the rising portion after the metal and resin components have been joined.

8. A method of manufacturing an electronic apparatus casing comprising integrally joining metallic parts and resin parts having a rib or boss portion by applying a film-shaped adhesive agent on one or more surfaces of the metallic parts and then injecting a resin onto the film-shaped adhesive agent using an area where a rib or boss is to be formed as a flow path.

9. The method according to claim 8, wherein is included the steps of degreasing the metallic parts, thermally adhering the film-shaped adhesive onto a surface of the metallic parts with pressure, setting the metallic parts in a metallic mold, injecting the resin into the mold with pressure, and then removing the resultant product from the mold.

10. The method according to claim 8, wherein is included the steps of degreasing and washing the metallic parts, setting the metallic parts in a metallic mold, placing the film-shaped adhesive on the metallic parts in the metallic mold, fastening the metallic mold, injecting the resin into the mold with pressure, and then removing the resultant product from the mold.

11. The method according to claim 8, wherein is included the steps of degreasing and washing a metallic sheet, thermally adhering the film-shaped adhesive onto the metallic sheet with pressure, machining the metallic sheet so as to form said metallic parts therefrom, setting the metallic parts in a metallic mold, injecting the resin into the mold with pressure, and then removing a resultant product from the mold.

12. A method of manufacturing a composite integrated body for an electronic apparatus, said body including a metal component having a surface and a resin component, said resin component having a rib or boss portion, said method comprising:

cleaning said metal component;

forming an organic film on said surface of the metallic component by treating the metal component with a surface processing agent;

arranging said metal component in a metallic mold;

fastening the mold; and injecting a resin into the mold using an area where said boss or said rib is to be formed as a flow path.

13. The method according to claim 12, wherein said metal component is formed from a metal comprising aluminum.

14. The method according to claim 12, wherein the surface processing agent is a triazinethiol.

15. A method of manufacturing a composite integrated body for an electronic apparatus, said body including a metal component having a surface and a resin component, said method comprising:

cleaning said metal component;

forming an organic film on said surface of the metallic component by treating the metal component with a surface processing agent comprising 6-sodium mercaptide-2,4-dimercaptide-1,3,5-triazine;

arranging said metal component in a metallic mold;

fastening the mold; and injecting a resin into the mold to form the resin component.

16. The method according to claim 12, wherein said resin comprises an ABS resin or a polymer alloy containing ABS resin.

17. A method according to claim 12, wherein the metal component comprises a thin metallic sheet for forming a bottom portion of the casing, and said boss or rib is formed from resin.

18. A method of manufacturing an electronic apparatus housing or casing by in-mold forming in which aluminum and resin are integrally formed into one body by means of injection molding, said method including the steps of: cleaning one or more aluminum parts having a surface for insert use; generating a hydrate on the surface of the aluminum part when the aluminum part is dipped in water; and injecting resin into a metallic mold after the aluminum part has been set and fastened in the metallic mold.

19. The method according to claim 18, wherein said water has a temperature of 50° to 80° C.

20. The method according to claim 18, wherein said resin comprises an ABS resin or a polymer alloy containing ABS resin.

21. The method according to claim 18, wherein said one or more aluminum parts are in the form of a thin metallic sheet forming a bottom portion of the casing, and said boss or rib are formed from resin.

* * * * *

UNITED STATES PATENT AND TRADEMARK OFFICE
CERTIFICATE OF CORRECTION

PATENT NO. : 5,531,950
DATED : July 2, 1996
INVENTOR(S) : Kouichi KIMURA et al.

It is certified that error appears in the above-indentified patent and that said Letters Patent is hereby corrected as shown below:

Column 2, line 7, delete "Hg" and substitute --Mg--;

Column 2, line 52, delete "though-" and substitute --through- --.

Column 4, line 51, delete "OP" and substitute --OF--.

Signed and Sealed this

Seventeenth Day of September, 1996

Attest:

BRUCE LEHMAN

*Attesting Officer*       *Commissioner of Patents and Trademarks*